United States Patent [19]
Ehrlinger

[11] Patent Number: 4,526,054
[45] Date of Patent: Jul. 2, 1985

[54] GEAR TRANSMISSION WITH SPLASH LUBRICATION

[75] Inventor: Friedrich Ehrlinger, Friedrichshafen, Fed. Rep. of Germany

[73] Assignee: Zahnradfabrik Friedrichshafen AG, Fed. Rep. of Germany

[21] Appl. No.: 470,611

[22] Filed: Feb. 28, 1983

[30] Foreign Application Priority Data

Mar. 6, 1982 [DE] Fed. Rep. of Germany ....... 3208100

[51] Int. Cl.³ .................... F16H 57/04; F01M 3/00
[52] U.S. Cl. .................... 74/467; 74/606 R; 184/6.12; 184/6.3
[58] Field of Search ............ 74/467, 606 R; 184/6.12, 6.3

[56] References Cited
U.S. PATENT DOCUMENTS

| 1,220,810 | 3/1917 | Alquist | 184/6.12 |
| 1,220,811 | 3/1917 | Alquist | 74/467 |
| 1,987,303 | 1/1935 | McVeigh | 184/6.3 |
| 2,026,662 | 1/1936 | Watson | 184/6.3 |
| 2,049,234 | 7/1936 | Thomas et al. | 74/467 |
| 2,069,826 | 2/1937 | Frank | 184/6.3 |
| 2,517,913 | 8/1950 | Nickle | 74/606 R |
| 2,681,126 | 6/1954 | Searls | 184/6.12 |
| 2,743,627 | 5/1956 | Christenson | 74/606 R |
| 3,529,698 | 9/1970 | Nelson | 184/6.12 |
| 3,583,526 | 6/1971 | Mulleder et al. | 184/6 |
| 3,601,515 | 8/1971 | Pelizzoni | 74/467 |
| 3,722,321 | 3/1973 | Walker et al. | 74/606 R |
| 4,169,519 | 10/1979 | Hirt et al. | 184/6.12 |

FOREIGN PATENT DOCUMENTS

| 66997 | 9/1969 | Fed. Rep. of Germany . |
| 2413356 | 10/1975 | Fed. Rep. of Germany . |
| 714351 | 11/1931 | France . |
| 1175154 | 12/1969 | United Kingdom . |
| 983361 | 12/1982 | U.S.S.R. .................. 74/467 |

Primary Examiner—Lawrence J. Staab
Assistant Examiner—Michael David Bednarek
Attorney, Agent, or Firm—Hayes, Davis & Soloway

[57] ABSTRACT

A transmission, e.g. a wheel hub gear (1), with a load-dependent, controllable splash lubrication. It has a second, oil storage, zone (12), which is a continuation of its housing (2). This oil storage zone (12) has an annular chamber (16). By displacing oil from the first zone (11) into the second zone (12) via an interconnection port (13), a displacement which is achieved by means of centrifugal forces, by draw-tube-like interconnection ports, or by integrated displacement elements (18, 19), one obtains a reduction of the submersion depth (9) of the rotating gear parts (4) to a thickness (8) of an oil ring (7) which forms at the interior casing surface (6). The minimum oil ring (7a) which is thus established secures adequate residual lubrication during normal operation of the gear with minimal energy losses from splashing, etc. For occasional higher loads, e.g. during braking or in heavy duty use, the submersion depth (9) can be rapidly increased using a control device (10), without any pressurized oil circulation system being needed. This changeover can be effected through a simple connection (20, 21) of operating elements. It can be remotely operable or it can be coupled with other activation elements of the gear (switching levers, brakes, clutches, etc.).

17 Claims, 6 Drawing Figures

GEAR TRANSMISSION WITH SPLASH LUBRICATION

The invention relates to gear transmissions with splash lubrication, that is without external oil-pumping systems.

With splash-lubricated gears, it is usual to select the oil-filling level or the dimensions of the housing so that the splashing action of rotating parts of the gear, during normal operation, is just barely large enough to assure the necessary lubricating effect while avoiding energy losses due to unnecessarily deep submersion of the rotating parts. As a rule, this is accomplished by reserving a sufficient free space between the rotating parts and interior wall of the housing. With more stringent requirements for compact design with higher power densities, the operation of splash lubrication has, in the past, been unsatisfactory, as the power loss due to the splashing of the gear parts represents a large amount of unnecessary energy even in a low-load operation. Lowering the oil level in the gear housing was deemed particularly inappropriate when gears were involved which were subject to strongly fluctuating stresses or which had built-in brakes or clutches. In such cases, forced circulation lubrication with pumping systems and control valves in the intake have hitherto been deemed unavoidable. Thus West German Pat. No. DE-PS 28 02 676 discloses a "lubricating oil supply device for multiple disk clutches in an oil bath". Here the inflow of lubricating oil from a pressurized oil circulation system to the clutch activation system is supplied only in connection with and during the activation of the clutch, by means of a control sleeve at the clutch body, in such a fashion that the oil supply to the clutch is minimal or zero during normal operation but, during the clutching process, is increased or is at maximum. Up to now, there has been no possibility of providing a similar effect, which are comparable in their action and which depend on load, for splash-lubricated gears even though splash lubrication, primarily for reasons of cost, is desirable.

An object of the present invention is to provide an arrangement of splash-lubrication of gears, in a simple fashion, with minimal lubrication in standard operation but with full lubrication under load conditions.

According to the invention there is provided a gear transmission having a gear housing and splash lubrication in which in its idle state, the gear housing is filled with oil up to a desired level (3) and in an operating state, the oil is carried along by rotating parts in the direction of rotation to form an oil ring (7), which contacts an interior casing surface (6) of the gear housing (2), with a radial thickness (8) which is determined by the filling volume of oil to provide rotating parts with a submersion depth (9) in the oil which is adequate for splash lubrication, in which there is provided means associated with the gear housing (2) by which the submersion depth (9) can be changed as desired in dependence on load conditions of the transmission (1).

The oil level remains unchanged with respect to the prior art, and the gear is designed with an unchanged housing diameter. But now the gear has the oil ring thickness, formed on the interior wall of the housing, which can be limited in standard operation and can be increased during higher loading of the gears.

As a result, energy losses are greatly reduced, due to the reduced splashing of the rotating parts, without having to accept the extra expense of a pressurized oil circulation system. This is especially important for wheel hub transmission for which splash lubrication is the only convenient type because of the difficulty of connecting oil lines with the hub. Furthermore, the invention makes it possible to adequately splash lubricate a hub transmission which is often subjected to peak loads or additional loads, by increasing lubricating and-/or cooling power during high load periods, without having to accept the disadvantages of separate oil supply devices. This advantage is especially valuable, e.g. in the case of gears for cross-country vehicles with a low rpm working range and a so-called high range drive for road use.

The invention can also be used for gears with integrated brakes or friction clutches, whose heat is generated in surges and must be accommodated quickly.

Preferably, the interior casing surface (6) has two axially neighboring zones of which the first (11) is used for splash lubrication and the second (12) is used as a reservoir for oil which flows out of the first zone (11) under normal operating conditions. Both zones (11, 12) have connections (13) in the area of the minimum volume oil ring (7A) which has remained in the first zone (11). During normal operation, oil from the first zone (11) can be displaced through said connection (13) into the second zone (12), and, with heavy-load operation, oil can be returned from the second zone (12) into the first zone (11). This permits adaptation of a transmission by means of a simply installed, axial extension of the gear housing outside the space occupied by the rotating gear parts. This can be accomplished because the torques which emanate from the rotating gear parts are lacking in the area of the second zone.

Also preferably, the second zone (12) has a capacity corresponding to the difference of the first oil ring (7) and a second oil ring (7A); when this capacity is filled, the submersion depth (9) in the first zone (11) at least still coincides with the base of the teeth of a gear (4) which is rotating on the outermost diameter. The purpose of this is to switch off completely the splash lubrication for especially low loads, in favor of individual oil sprays that are stripped from the oil ring.

Also preferably, oil ring control devices (10) are disposed in the gear housing (2), such that more or less oil can be exchanged between the two zones (11/12), depending on load. The purpose of this is to balance the adaptation very sensitively to actual need, through reversing devices that are built into the gear housing itself.

Also preferably, the control device (14) a perforated separation wall (15) with interconnection ports (13) that are designed as drawing tubes (i.e., buckets or scoop wells), through which the second zone (12) can be filled up if the centrifugal force increases and can be party emptied as the centrifugal force decreases. The control device (14) is preferably a perforated separation wall (15) with interconnection ports (13), which are designed as drawing tubes, by means of which the second zone (12) can be party emptied as the centrifugal force increases and can be filled up as the centrifugal force decreases. The purpose of this is to make the adaptation automatically controllable in proportion to the rotational speeds.

The control device (14) may have a radial web (15) between the two zones (11, 12) which contacts the interior casing surface (6) and which is penetrated by ports (13) of a desired size. The purpose of this is that the oil in the second zone should have the smallest possible contact surface with the oil in the first zone and nevertheless should participate in the cooling process.

The control device (14) may comprise an increased diameter of the interior casing area (6) in the second zone (12). The purpose of this is to favor outflow of the oil by higher centrifugal force and by a radial extension of the second zone, a feature which yields a greater capacity.

The second zone (12) may consist at least partly of an annular chamber (16). The purposes of this is to control the oil fill of the second zone in a limited fashion and to prevent it from forming an axis-parallel backflow into the area of the rotating gear parts. Here, the annular chamber can easily be formed by virtue of the fact that the second zone of the casing area is arranged concentically over a wheel hub.

The control device (14) may have control valves (17) which are inserted into the interconnection ports (13). The purpose of this is to effect the outflow or the intake of oil only during certain driving conditions, for which definite centrifugal forces can be specified.

The control device (14) may have pressure-dependent control valves (17). The purpose of this is that the control device should also react to possible overfilling of the housing through relief into the second zone.

The control device (14) may have temperature-dependent control valves (17). The purpose of this is to adjust the outflow or intake, in dependent on need, with respect to the heating of running or friction surfaces.

The control device (14) may comprise a displacement element (18), which is built into the second zone (12) and which has a small volume under normal conditions, by means of which the capacity of the second zone (12) can be changed. The purpose of this is to create an oil-storage capability for the second zone, independent of driving conditions, etc. and/or to control an oil return from there into the first zone by external means. For instance, this can be done by pumping up a hose to a greater or lesser extent within the annular chamber of this second zone. This hose then forces the oil present there back into the first zone.

An axially movable radial separation wall (19) may be provided, by means of which the capacity of the second zone (12) can be changed. The purpose of this is to achieve a suitable control as in the case of claim 13, but in such a fashion that a piston-like, activatable separation wall in zone 2 is changed as regards capacity, so as to correspond to the desired lowering of the submersion depth in zone 1.

The actuator of the displacement element (18) and/or of the axially movable separation wall (19) may be effectively connected with another activation device (20) to control the gears. The purpose of this is to couple the adaptation of the submersion depth to the selection elements for the driving conditions, so that no individual operation of the oil-reversal devices is necessary.

The actuation of the displacement body (18) and/or of the separation wall (19) may be effected through pressure means with the actuation of mechanical positioning elements (21, 22) being possible during operating conditions.

The actuation of the control device (14 or respectively 18 or 19) may be coupled with the actuation of a brake or a clutch (25) in the first zone (11).

The control device may conduct oil drained from the first zone (11) through a cooler (26) into the second zone (12). The purpose of this is to cool the oil drained off from the area of the rotating gear parts before it is recycled.

The invention will now be described, by way of example, with reference to the accompanying drawings, in which:

FIG. 1 diagrammatically illustrates a wheel-hub transmission having the inventive arrangement of the two oil zones;

Figure 1:
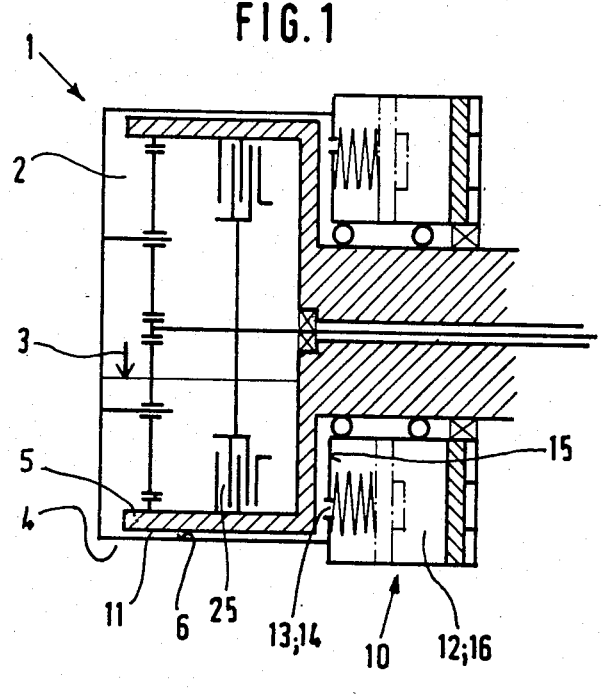

In FIG. 1, the transmission 1 consists of a housing 2, which is filled with oil up to a filling level 3, when in its idle state, i.e. far enough so that rotating gear parts are substantially submerged in the oil.

Figure 2:
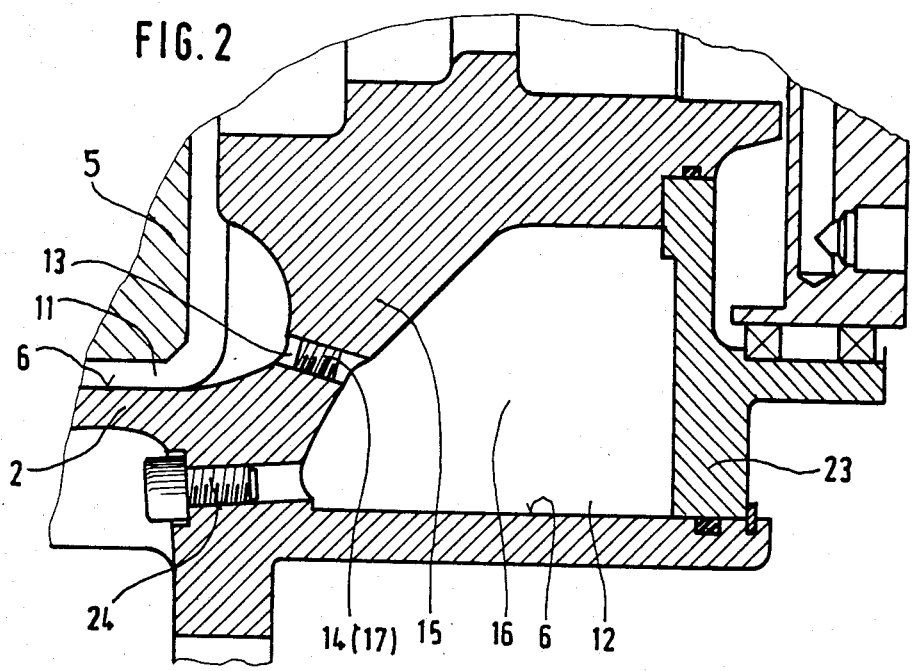
FIG. 2 is an enlarged illustration of a portion of FIG. 1, modified to have a second zone of constant volume.

Through the rotation of the transmission in its operating state, a more or less thick circumferential oil ring 7, 7a forms about the stationary gear parts 5 (or with respect to the gear parts which turn more slowly), on the interior casing surface 6 of the housing 2, depending on the rpm and on the filling volume. The thickness 8 of the oil ring provides a residual submersion depth 9 of the rotation gear parts. The invention provides means 10 to adjust the thickness 9 to the load on the transmission 1. These means 10 are found in or at the beginning of a second zone 12 which axially extends the first oil storage zone 11. In the example of FIGS. 1 and 2, these means 10 consist of an oil control device 14, which is situated in the region of influence of the rotating gear parts 4, and which is formed only by restricted interconnection port cross sections 13 and/or by further flow-restricting measures. The separation wall 15 of this oil control device 14 contains the interconnection ports 13 and can either be a partially open radial web or the rear wall of the gear housing 2 itself, in which case the rear wall defines holes (as the interconnection ports 13).

The separation wall 15 extends into the wheel hub and, together with the second zone 12, forms an annular chamber 16. This prevents the formation of uncontrollable oil backflows along the rotation axis; it also prevents the active oil ring 7 in the gear housing 2 from becoming too thin to still assure adequate residual lubrication.

In FIG. 2, the annular chamber 16 of the second oil storage zone 12 has an interior casing surface 6. This casing surface 6 has a diameter that is larger than that of the first zone 11. It also has interconnection ports 13 which are set at a slant to the first oil ring 7, and which resemble drawing tubes. This design is favorable in cases where a low submersion depth 9 is required to high rpm and where, at lower rpm, with higher torques, a more intense lubrication without outside control is provided by means of a greater submersion depth 9. When the rotational speed declines, an appropriate portion of the oil here flows back from the annular chamber 16 into the first oil storage zone 11, as the stagnation pressure in the interconnection ports 13 declines. Depending on need, the flow through the interconnection ports 13 can be adjusted for certain operating conditions by control valves 17 inserted within said ports 13. Thus, for example, the possibility suggests itself of using temperature-controlled valves so that the hot or cold condition of the oil will become a criterion for its corresponding outflow or inflow respectively. The lower edge of the port 13 should here advantageously be situated approximately at the level of the minimal oil ring 7A. It is also favorable if the port 13 is disposed somewhat to the side of the actual rotation region, e.g. in a recess in the wall, because, as a rule, lower stagnation pressures generally prevail there than directly next to the rotating gear part 4. In place of a separation wall 15, a radial web between the radial ribs, designed for the height of the desired minimal oil ring 7A, would have a comparable action as the connection holes 13.

Figure 3:
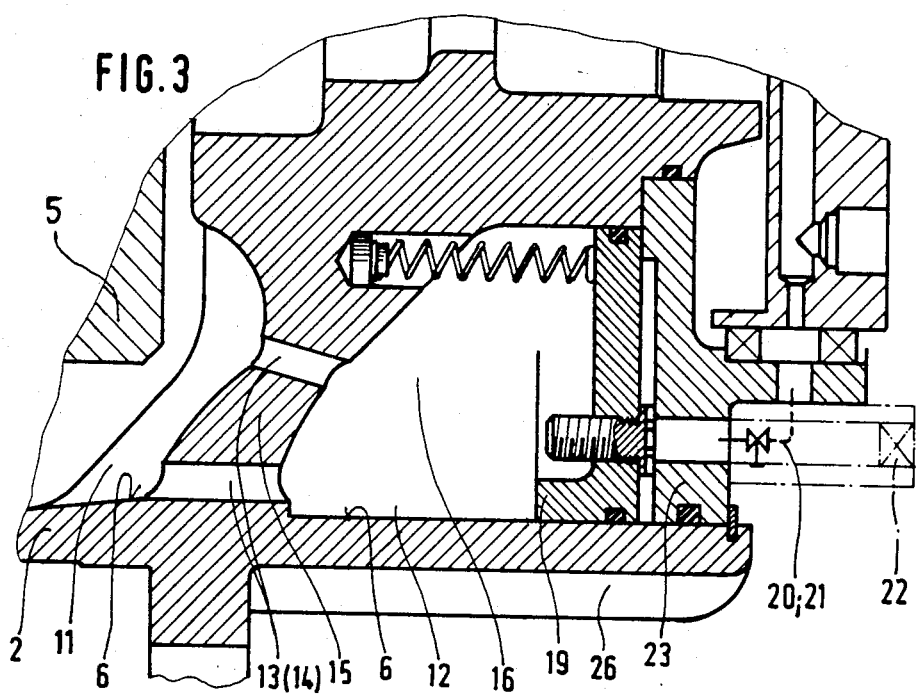
FIG. 3 is an enlarged illustration of a similar portion to that of FIG. 2 but with an axially movable separation wall, as diagrammatically illustrated in FIG. 1, which acts to adjust the capacity of the second zone.

In FIG. 3, the capacity of the annular chamber 16 can be changed by means of an axially movable displacement element 18. Another separation wall 19 in the annular chamber 16 is normally held in its open position by means of springs, but, acts as a piston which can be pushed towards the fixed separation wall 15 (radial web) and toward the ports 13, when or as long as more oil is required in the first zone. The hydraulic actuator 20 to move the wall 19 against the spring pressure can be combined, as needed, with gear changing elements, brakes, clutches, etc., in such a fashion that the additional oil is also supplied exclusively during the respective peak loads. A remote operation connection 21 is provided for the operation of the actuator 20. This can also be adjusted or controlled individually by hand. When a positioning element 22 provides a mechanical stop, it is also possible to move or to adjust the displacement wall 19 without disassembly.

Figure 4:
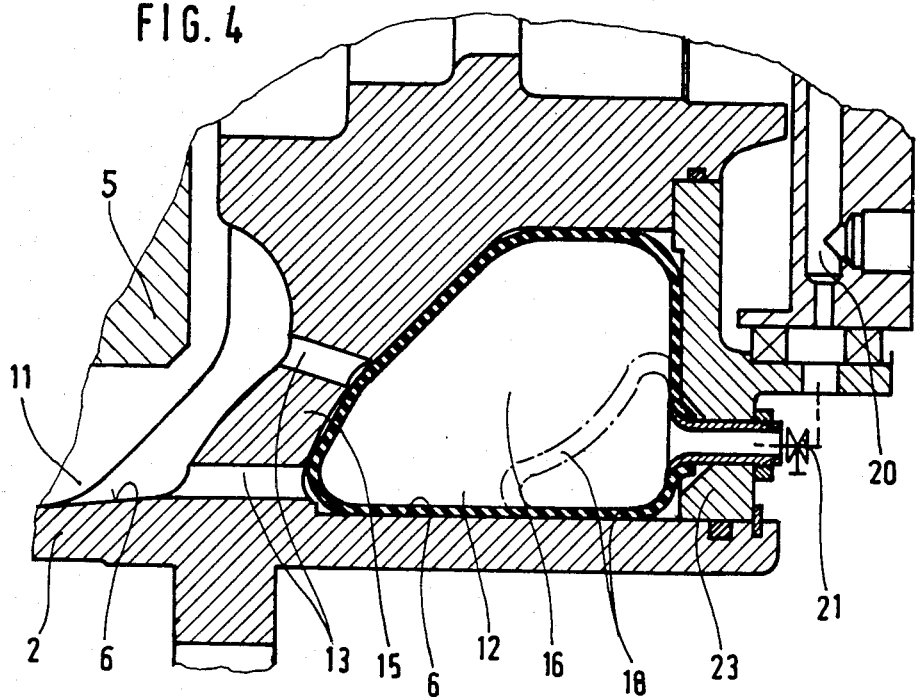
FIG. 4 is similar to FIG. 3 but with the wall replaced by an inflatable elastic hose to displace the oil from the second zone.

In FIG. 4, an annular inflatable tube 18 replaces the spring-loaded displacement wall 19. Depending on the filling pressure, the air hose displaces more or less of the content of the annular chamber 16, and pushes back a corresponding amount of oil through the connection 13 into the first zone 11.

Figure 5:
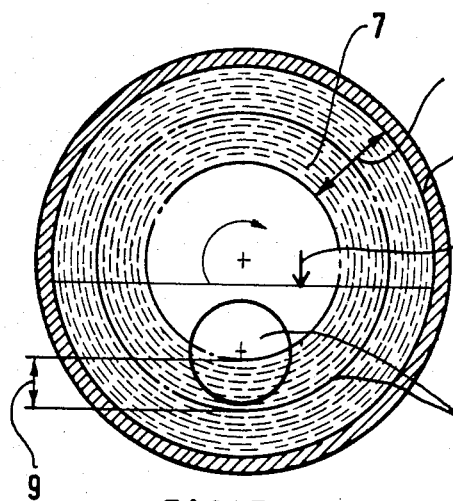
FIGS. 5 and 6 illustrate the principle of the oil ring formation relative to the filled level of the transmission.
Figure 6:
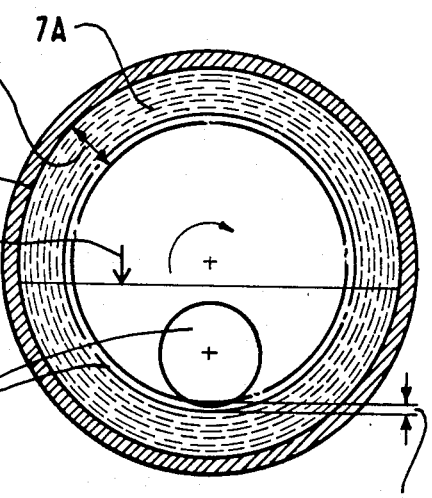

FIGS. 5 and 6 once again show the function of the invention by means of a comparison of the conventional operating mode (FIG. 5) and the improved operating mode (FIG. 6). The filling level 3 (in the idling state) can be assumed to be about the same in both cases.

For a particular rotational speed, there is created an oil ring 7, which lubricates the rotating gear parts 4 with a submersion depth 9. The gear parts 4, under low load, have only a minimal submersion depth 9A into the oil ring 7A, with practically only tangential contact. This oil ring 7A is created by draining off a portion of the oil content into the second oil storage zone 12, which is provided in accordance with the invention, axially to the first oil storage zone 11. At higher loads (e.g. during braking) oil is again returned from there into the first zone 11. As soon as this happens, the thicker oil ring 7 can again establish itself to intensify lubrication and/or cooling of the gear parts 4 with its thicker submersion depth 9. In the idle state, the two oil storage zones 11, 12 communicate freely with one another, and the ring chamber 16 does not have more capacity than corresponds to the difference between the minimum and maximum oil ring. As a result, with proper level control, it is not possible, despite the reversals, that oil lubrication will at anytime be lacking altogether. It has proven optimal to bring the minimal oil ring 7A approximately to a diameter which corresponds to the tips of the teeth of the outermost rotating gear part.

The drainage of a partial oil quantity by means of the reversal device also offers the possibility to cool the drained-off oil more intensively in the area of the cooling surfaces 26 or of coolers. For this purpose, for instance, the axially movable separation wall 19 could be equipped with a check valve. During motion toward the first zone 11, this would withdraw oil from the cooling system, but (after braking, for example) the oil could then again flow back into it.

The invention achieves an adaptation in response to need, without the use of pumps, for gears that are only splash-lubricated. Naturally, this is suitable for other types of gear transmissions than the present application involving wheel hub gears. Application with stationary rotation axles can also be suitable equipped with the characteristics of the invention.

I claim:

1. A gear transmission having a gear housing and splash lubrication in which in its idle state, the gear housing is filled with oil up to a desired level and in an operating state, the oil is carried along by rotating gear parts in the direction of rotation to form an oil ring, which contacts an interior casing surface of the gear housing, with a radial thickness which is determined by the volume of said oil to provide rotating parts with a submersion depth in the oil which is adequate for the splash lubrication, in which gear housing the submersion depth can be changed as desired in dependence on load conditions of the transmission and wherein the interior of the housing defines an axis of rotation and has two axially neighboring zones in the first of which the splash lubrication takes place and the second of which forms another cylindrical collection reservoir for a portion of the lubrication oil from the first zone, the zones being interconnected by a port in the location of a minimum desired oil ring thickness in the first zone, whereby during normal operation, oil from the first zone is displaced through said interconnection port into the second zone, and means for returning oil from the second zone into the first zone under heavy-load operation.

2. A gear transmission according to claim 1, wherein the second zone has a capacity corresponding to the difference in volume of the maximum desired thickness of oil ring and the minimum desired thickness of oil ring, such that when this capacity is filled, the submersion depth in the first zone at least still includes the base of teeth of the gears rotating on the outermost diameter.

3. A gear transmission according to claim 1, wherein an oil flow control device is disposed in the gear housing between the zones such that more or less oil can be exchanged between the two zones depending on load.

4. A gear transmission according to claim 3, wherein the control device is a separation wall with an interconnection port that is designed as a drawing tube, through which the second zone can be filled up when the centrifugal force of the oil in the first zone increases and can be at least party emptied as this centrifugal force decreases.

5. A gear transmission according to claim 3, wherein the control device is a separation wall with an interconnection port which is designed as a drawing tube, by means of which the second zone can be partly emptied as the centrifugal force of oil in the first zone increases and can be filled up as this centrifugal force decreases.

6. A gear transmission according to claim 3, wherein the control device is a radial web between the two zones which contacts the interior housing surface and which is penetrated by interconnection ports of a cross-sectional size to provide desired oil transfer therethrough.

7. A gear transmission according to claim 3, wherein the control device has the same diameter as and is an extension of the diameter of the interior casing surface in the second zone.

8. A gear transmission according to claim 1, wherein the second zone consists at least partly of an annular chamber.

9. A gear transmission according to claim 1, wherein the control device has a control valve in the interconnection port.

10. A gear transmission according to claim 9, wherein the control valve is a pressure-dependent control valve.

11. A gear transmission according to claim 9, wherein the control valve is a temperature-dependent control valve.

12. A gear transmission according to claim 3, wherein the control device comprises a displaceable wall, partially defining the second zone (12) and which is displaceable to change the capacity of the second zone as desired to ensure that a desired radial thickness of oil ring in the first zone is provided.

13. A gear transmission according to claim 12, wherein the wall is axially movable.

14. A gear transmission according to claim 12, wherein an actuator for the displaceable wall is provided.

15. A gear housing according to claim 3, where the control device is an inflatable body disposed in the second zone to vary the capacity of the second zone in dependence on the degree of inflation thereof.

16. gear transmission according to claim 3, wherein actuation of the control device is arranged to occur together with the activation of a brake or a clutch in the first zone.

17. A gear transmission according to claim 3, comprising oil cooling means associated with the second zone.

* * * * *

UNITED STATES PATENT AND TRADEMARK OFFICE
CERTIFICATE OF CORRECTION

PATENT NO. : 4,526,054
DATED : July 2, 1985
INVENTOR(S) : Friedrich EHRLINGER

It is certified that error appears in the above–identified patent and that said Letters Patent are hereby corrected as shown below:

Claim 16, line 14, insert the word --A-- (capitalized) before the word "gear".

Signed and Sealed this

Fifteenth Day of October 1985

[SEAL]

Attest:

DONALD J. QUIGG

Attesting Officer

Commissioner of Patents and
Trademarks—Designate